United States Patent
Alexandrovichserov et al.

(10) Patent No.: US 8,039,172 B2
(45) Date of Patent: Oct. 18, 2011

(54) CATHODE CATALYST FOR A FUEL CELL, AND A MEMBRANE-ELECTRODE ASSEMBLY FOR A FUEL CELL AND A FUEL CELL SYSTEM COMPRISING THE SAME

(75) Inventors: Alexey Alexandrovichserov, Suwon-si (KR); Chan Kwak, Suwon-si (KR); Si-Hyun Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1257 days.

(21) Appl. No.: 11/716,023

(22) Filed: Mar. 9, 2007

(65) Prior Publication Data
US 2007/0218349 A1 Sep. 20, 2007

(30) Foreign Application Priority Data
Mar. 9, 2006 (KR) .................. 10-2006-0022253

(51) Int. Cl.
*H01M 4/02* (2006.01)
(52) U.S. Cl. ....................................... 429/523; 429/502
(58) Field of Classification Search .................. 429/523
See application file for complete search history.

(56) References Cited

U.S. PATENT DOCUMENTS

| | | | |
|---|---|---|---|
| 2004/0137305 A1* | 7/2004 | Inoue et al. | 429/36 |
| 2006/0003211 A1* | 1/2006 | Sun et al. | 429/30 |
| 2006/0286430 A1* | 12/2006 | Nor | 429/38 |

* cited by examiner

*Primary Examiner* — Ula C. Ruddock
*Assistant Examiner* — Jacob Marks
(74) *Attorney, Agent, or Firm* — Robert E. Bushnell, Esq.

(57) ABSTRACT

A cathode catalyst for a fuel cell, and a membrane-electrode assembly for a fuel cell and a fuel cell system that includes the same. The cathode catalyst includes an active material of an A-B-X compound where A is one of Cu, Ag or a combination thereof, B is one of Nb, Hf, Ta or combinations thereof, and X is one of S, Se, Te or combinations thereof, and a carbon-based material supporting the active material as a carrier.

18 Claims, 2 Drawing Sheets

CATHODE CATALYST FOR A FUEL CELL, AND A MEMBRANE-ELECTRODE ASSEMBLY FOR A FUEL CELL AND A FUEL CELL SYSTEM COMPRISING THE SAME

CLAIM OF PRIORITY

This application makes reference to, incorporates the same herein, and claims all benefits accruing under 35 U.S.C. §119 from an application for CATHODE CATALYST FOR FUEL CELL, AND MEMBRANE-ELECTRODE ASSEMBLY FOR FUEL CELL AND FUEL CELL SYSTEM COMPRISING SAME earlier filed in the Korean Intellectual Property Office on 9 Mar. 2006 and there duly assigned Serial No. 10-2006-0022253.

BACKGROUND OF THE INVENTION

1. Field of the Invention

The present invention relates to a cathode catalyst for a fuel cell, and a membrane-electrode assembly and a fuel cell system including the same. More particularly, the present invention relates to a cathode catalyst having superior performance characteristics and good stability in an alkali-type fuel cell, and a membrane-electrode assembly and a fuel cell system including the same.

2. Description of the Related Art

A fuel cell is a power generation system for producing electrical energy through an electrochemical redox reaction of an oxidant and a fuel such as hydrogen or a hydrocarbon-based material such as methanol, ethanol, natural gas, and the like. A polymer electrolyte fuel cell is a clean energy source that is capable of replacing fossil fuels. It has advantages such as high power output density and energy conversion efficiency, operability at room temperature, and being small-sized and tightly sealed. Therefore, it can be applicable to a wide array of fields such as non-polluting automobiles, and electricity generation systems and portable power sources for mobile equipment, military equipment, and the like.

Representative exemplary fuel cells include a polymer electrolyte membrane fuel cell (PEMFC) and a direct oxidation fuel cell (DOFC). The direct oxidation fuel cell includes a direct methanol fuel cell which uses methanol as a fuel.

The polymer electrolyte fuel cell has an advantage of a high energy density and high power, but also has problems in that there is the need to carefully handle hydrogen gas and the requirement of accessory facilities such as a fuel reforming processor for reforming methane or methanol, natural gas, and the like in order to produce hydrogen as the fuel gas.

On the contrary, a direct oxidation fuel cell has a lower energy density than that of the gas-type fuel cell but has the advantages of easy handling of the liquid-type fuel, a low operation temperature, and no need for additional fuel reforming processors. Therefore, it has been acknowledged as an appropriate system for a portable power source for small and common electrical equipment.

In the above-mentioned fuel cell systems, the stack that generates electricity substantially includes several to scores of unit cells stacked adjacent to one another. Each unit cell is made out of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to an anode and adsorbed on catalysts of the anode, and the fuel is oxidized to produce protons and electrons. The electrons are transferred to the cathode via an out-circuit, and the protons are also transferred to the cathode through the polymer electrolyte membrane. In addition, an oxidant is supplied to the cathode, and then the oxidant, protons, and electrons react on catalysts of the cathode to produce electricity along with water.

One goal in producing fuel cells is to provide a catalyst that is both stable and has superior activity. Therefore, what is needed is an improved catalyst for a fuel cell, and a fuel cell having the same.

SUMMARY OF THE INVENTION

It is therefore an object of the present invention to provide a highly active and stable cathode catalyst for a fuel cell and a method of preparing the same.

It is also an object of the present invention to provide a membrane-electrode assembly which includes the above cathode catalyst.

It is still an object of the present invention to provide a fuel cell system which includes the above cathode catalyst.

The present invention relates to a cathode catalyst for a fuel cell. Particularly, the present invention relates to a cathode catalyst for an alkaline fuel cell (AFC) using an alkali solution as an electrolyte. Since the alkaline fuel cell (AFC) has characteristics of high power output density, operability at low temperatures, and rapid drivability, it has been researched to be used for special purposes, for example, as a power source for spacecraft and submarines. Particularly, since it can operate at a low temperature of −40° C., it has been paid attention to as a power source for extremely cold areas.

The alkaline fuel cell generates electricity along with $OH^-$ ions through the following process: water and electrons are generated though reaction of a $H_2$ fuel at an anode and $OH^-$ in an electrolyte, and then the water and electrons move to a cathode and react with oxygen supplied inside the cathode, thereby generating electricity along with $OH^-$ ions.

The present invention provides a cathode catalyst for a fuel cell including an active material including an A-B-X compound (herein, A is one of Cu, Ag, and a combination thereof, B is one of Nb, Hf, Ta, and a combination thereof, and X is one of S, Se, Te, and a combination thereof.) and a carbon-based material as a carrier supporting the active material.

According to one aspect of the present invention, there is provided a cathode catalyst that includes an active material that includes an A-B-X compound, wherein A is selected from the group consisting of Cu, Ag, and a combination thereof, B is selected from the group consisting of Nb, Hf, Ta, and combinations thereof, and X is selected from the group consisting of S, Se, Te, and combinations thereof and a carrier of a carbon-based material supporting the active material.

The A-B-X compound can include 35 to 55 atom % of A, 25 to 35 atom % of B, and 10 to 40 atom % of X. The A-B-X compound can be a metal cluster compound. The active material can have an average particle diameter ranging from 1 to 3 nm. The active material can be supported in an amount ratio ranging from 5 to 70 wt % by a carrier. The carrier can be activated carbon, denka black, ketjen black, acetylene black, graphite or combinations thereof. The cathode catalyst can be adapted to be used for an alkaline electrolyte fuel cell. The cathode catalyst can be adapted to be used for an alkaline electrolyte direct oxidation fuel cell. The cathode catalyst can be adapted to be used for a mixed reactant fuel cell.

According to another aspect of the present invention, there is provided a method of making a catalyst for a cathode, including mixing an A element-containing compound and a B element-containing compound in a first solvent, adding a carbon-based material to the first solvent, evaporating the first solvent to produce a power that includes an A-B element containing compound supported on the carbon-based material, mixing the powder and an X element-containing compound into a second solvent and heat-treating the second solvent that contains the powder and the X element-containing compound, wherein A is one of Cu, Ag, and a combination thereof, and B is one of Nb, Hf, Ta, and combinations thereof.

The A element-containing compound can be an alkoxide that includes an element such as Cu, Ag, and a combination thereof. The B element-containing compound can be an alkoxide that includes an element such as Nb, Hf, Ta or combinations thereof. The X element-containing compound is a powder or an oxide of an element such as S, Se, Te or combinations thereof. The heat treatment can be performed at 250 to 450° C. The heat treatment can be performed under a reduction atmosphere.

According to yet another aspect of the present invention, there is provided a membrane-electrode assembly that includes an anode and a cathode opposing each other and an electrolyte arranged between the anode and the cathode, wherein the cathode includes a cathode catalyst that includes an active material comprising an A-B-X compound, wherein A is one of Cu, Ag, and a combination thereof, B is one of Nb, Hf, Ta and combinations thereof, and X is one of S, Se, Te, and combinations thereof and a carrier of a carbon-based material supporting the active material. The electrolyte can be an alkaline aqueous solution or a solid electrolyte membrane with a —OH group.

According to still another aspect of the present invention, there is provided a fuel cell system that includes at least one electricity generating element that includes at least one membrane-electrode assembly which includes an anode and a cathode facing each other and a polymer electrolyte membrane arranged therebetween, and a separator, a fuel supplier adapted to supply the electricity generating element with a fuel and an oxidant supplier adapted to supply the electricity generating element with an oxidant supply, wherein the cathode comprises a cathode catalyst includes an active material that includes an A-B-X compound, wherein A is one of Cu, Ag, and a combination thereof, B is one of Nb, Hf, Ta, and combinations thereof, and X is one of S, Se, Te, and combinations thereof; and a carrier of a carbon-based material supporting the active material. The fuel cell system can be an alkaline electrolyte fuel cell system, a direct oxidation alkaline electrolyte fuel cell system or a mixed reactant fuel cell system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
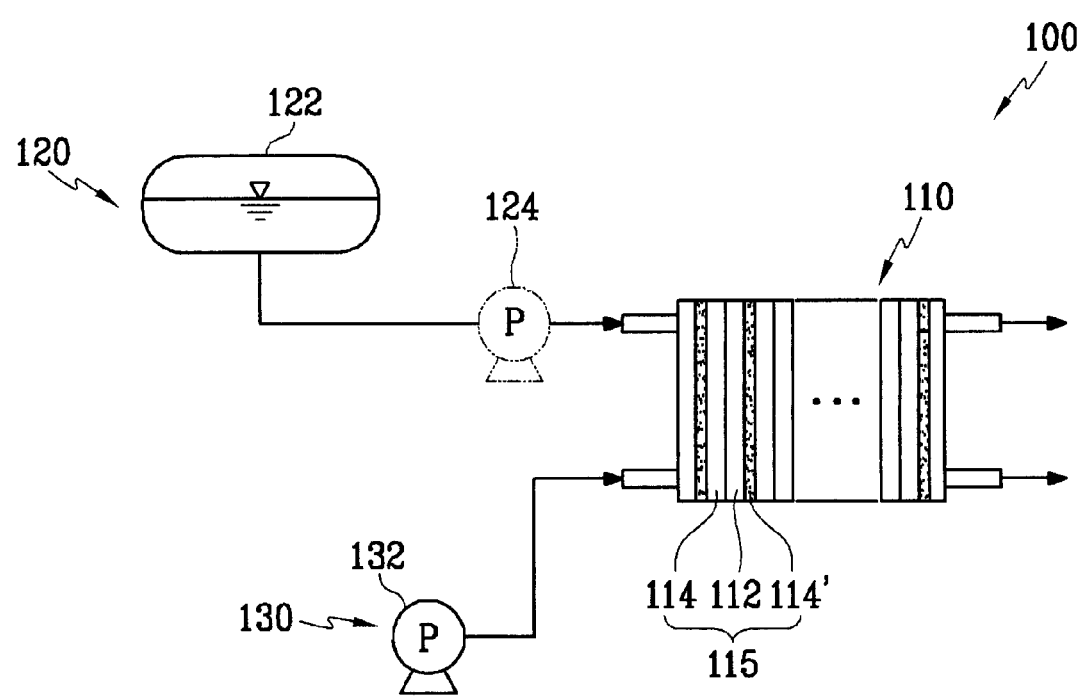
FIG. 1 is a view of the structure of a fuel cell system according to the present invention.

The present invention relates to a cathode catalyst for a fuel cell. Particularly, the present invention relates to a cathode catalyst for an alkaline fuel cell (AFC) using an alkali solution as an electrolyte. Since the alkaline fuel cell (AFC) has characteristics of high power output density, operability at low temperatures, and rapid drivability, it has been researched to be used for special purposes, for example, as a power source for spacecraft and submarines. Particularly, since it can operate at a low temperature of −40° C., it has been paid attention to as a power source for extremely cold areas.

The alkaline fuel cell generates electricity along with $OH^-$ ions through the following process: water and electrons are generated though reaction of a $H_2$ fuel at an anode and $OH^-$ in an electrolyte, and then the water and electrons move to a cathode and react with oxygen supplied inside the cathode, thereby generating electricity along with $OH^-$ ions.

The present invention provides a cathode catalyst for a fuel cell including an active material including an A-B-X compound (herein, A is one of Cu, Ag, and a combination thereof, B is one of Nb, Hf, Ta, and a combination thereof, and X is one of S, Se, Te, and a combination thereof.) and a carbon-based material as a carrier supporting the active material.

Herein, the A element has high catalyst activity for oxygen reduction and can include Cu or Ag. The A element is preferably included in the A-B-X compound in an amount ratio ranging from 35 to 55 atom %, and more preferably, in an amount ratio ranging from 40 to 45 atom %. When the A element is included at more than 55 atom %, it can deteriorate selectivity of an active material, while when it is less than 35 atom %, it can deteriorate activity of the active material.

Next, the B element plays a role of forming a cluster connection and stabilizing a catalyst and includes Nb, Hf, or Ta. The B element is preferably included in the A-B-X in an amount ratio ranging from 25 to 35 atom %, and more preferably, in an amount ratio ranging from 30 to 35 atom %. When the B element is included at less than 25 atom %, it can deteriorate activity of an active material, while when it is more than 35 atom %, it can disadvantageously make the particle size of the active material larger.

The X element can include one of S, Se, or Te. The X element is preferably included in the A-B-X compound in an amount ratio ranging from 10 to 40 atom %, and more preferably, in an amount ratio ranging from 15 to 25 atom %. When the X element is included at less than 10 atom %, it can deteriorate selectivity of an active material, while if it is more than 40 atom %, it can deteriorate activity thereof.

In particular, the A-B-X compound can include Cu—Nb—Te, Cu—Hf—Te, Cu—Ta—Te, Cu—Nb—Se, Cu—Hf—Se, Cu—Ta—Se, Cu—Nb—S, Cu—Hf—S, Cu—Ta—S, Ag—Nb—Te, Ag—Hf—Te, Ag—Ta—Te, Ag—Nb—Se, Ag—Hf—Se, Ag—Ta—Se, Ag—Nb—S, Ag—Hf—S, or Ag—Ta—S, and it preferably includes Cu—Nb—Te. In addition, the A-B-X compound has metal cluster connections. The metal clusters are formed by connecting metal ions. Generally, the metal cluster can be more stable when a main metal in the cluster has a big overlapped d-orbital. Accordingly, when a metal has high oxidation and thereby a large effective charge, it can easily become unstable. The metal can include transition elements, and particularly a halogen complex with a low oxidation number or a carbonyl complex of the second and third transition elements. For example, molybdenum chloride ($MoCl_2$) (II) has a structure of $[Mo_6Cl_8]^{4+}$ and a cluster of an octahedral $Mo_6$ unit. Since the B element includes Nb, Hf, or Ta, which can easily form cluster connections, the A-B-X compound can have a cluster structure due to the B element. Therefore, the compound can improve activity of a catalyst comprising it.

The A-B-X compound is prepared into an active material having an average particle diameter preferably ranging from 1 to 3 nm and more preferably ranging from 1 to 2.5 nm. When the active material has an average particle diameter of less than 1 nm, it can make the catalyst unstable, while if it has an average particle diameter of more than 3 nm, it can lower activity of the catalyst.

In addition, since the active material can have various properties depending upon a carrier, the A-B-X compound can include a carbon-based material as a carrier to improve activity. Specifically, the carbon-based material can include activated carbon, denka black, ketjen black, acetylene black, graphite, and the like.

The active material is preferably supported on a carrier in a weight ratio ranging from 5 to 70 wt %, and more preferably in a weight ratio ranging from 50 to 70 wt % based on the entire weight of the catalyst. When it is supported in a weight ratio of less than 5 wt %, the catalyst is so small as to have decreased activity, while when in a weight ratio of more than 70 wt %, the catalyst has decreased activity due to coagulation of particles.

According to an embodiment of the present invention, the catalyst for a fuel cell can be prepared in the following method: preparing a mixture by mixing an A element-containing compound with a B element-containing compound and adding a carbon-based material thereto, preparing a powder including the A-B-containing compound supported in the carbon-based material by drying the mixture; and mixing the powder with a X element-containing compound and heat-treating the resulting mixture. Herein, A is one of Cu, Ag, and a combination thereof, B is one of Nb, Hf, Ta, and combinations thereof, and X is one of S, Se, Te, and combinations thereof.

More specifically, the mixture is prepared by first mixing an A element-containing compound with a B element-containing compound in a solvent, and then adding a carbon-based material thereto. The A element-containing compound can include an alkoxide including an element such as Cu, Ag, and a combination thereof, and more particularly acetylacetic acid copper, acetylacetonate copper, $Cu(NO_3)_2$, or $AgNO_3$. In addition, the B element-containing compound can include an alkoxide including an element such as Nb, Hf, Ta, or combinations thereof, and more particularly, $C_{36}H_{51}Cl_2NbO_3$, $Hf[OC(CH_3)_3]_4$, (Hafnium(IV) tert-butoxide), or $Ta(OCH_2CH_2CH_2CH_3)_5$ (Tantalum(V) butoxide). The solvent can be one of water, alcohol or a mixture thereof. The carbon-based material plays the role of a carrier, and can be the same as mentioned above. The A and B element-containing compounds and the carbon-based material can be appropriately regulated depending on a desired amount ratio of each component in the final catalyst. Next, the prepared mixture is dried under vacuum to evaporate the solvent, resulting in a powder including an A-B-containing compound supported on a carbon-based material.

The powder is mixed with an X element-containing compound in a solvent, and the mixture is heat-treated to produce the cathode catalyst. Herein, the X element-containing compound can include a powder or an oxide such as S, Se, Te, and a combination thereof, and more particularly, can include a S powder, a Se powder, a Te powder, or $H_2TeO_3$. The solvent can include water, alcohol, and mixtures thereof as aforementioned.

The heat treatment is preferably performed at 250 to 450° C., and more preferably at 250 to 400° C. When the heat treatment is performed at a temperature of less than 250° C., the metal-containing compounds cannot be completely decomposed, while at a temperature of more than 450° C., the catalyst particles may be too large. In addition, the heat treatment is preferably performed under a reduction atmosphere, and more preferably under a hydrogen atmosphere.

According to the embodiment of the present invention, a cathode catalyst has high activity for reduction of an oxidant. Accordingly, the cathode catalyst can be used for an alkaline electrolyte fuel cell and a direct oxidation fuel cell. In addition, it can be used for a mixed reactant fuel cell that does not include a separator but includes a catalyst for selectively oxidizing a fuel at an anode catalyst layer and another catalyst for selectively reducing an oxidant at a cathode catalyst layer, and thereby, one in which oxidation of the fuel can occur only at the anode catalyst layer and reduction of the oxidant can occur only at the cathode catalyst layer even though the fuel and oxidant mixture are injected at both the anode and cathode catalyst layers.

In particular, the cathode catalyst has excellent activity in an alkaline electrolyte fuel cell, and more excellent activity for a direct oxidation fuel cell using a hydrocarbon fuel among the various types of alkaline electrolyte fuel cells. In addition, it can have excellent activity for a direct ethanol fuel cell using ethanol as a fuel, and accordingly can be most effectively applied thereto.

According to another embodiment of the present invention, a membrane-electrode assembly includes the cathode catalyst. The membrane-electrode assembly includes an anode and a cathode facing each other, and an electrolyte interposed therebetween. The anode and the cathode include a catalyst layer and an electrode substrate. The catalyst layer of the cathode includes a cathode catalyst of the present invention, and the catalyst layer of the anode includes a Pt or Ni-based alloy catalyst. The Ni-based alloy can include any one of Co-Ni, Fe-Ni, and so on, which are generally used for an anode of an alkaline fuel cell.

On the other hand, a cathode catalyst of the present invention can be supported in a carbon carrier or not supported as a black type. Suitable carriers include carbon such as activated carbon, denka black, ketjen black, acetylene black, and graphite, or inorganic material particulates such as alumina, silica, zirconia, and titania. The catalyst layer may further include a binder resin to improve its adherence and proton transfer properties.

The binder resin may be a polymer resin having a cation exchange group such as a sulfonic acid group, a carboxylic acid group, a phosphoric acid group, a phosphonic acid group, and derivatives thereof at its side chain. Non-limiting examples of the polymer include at least one proton conductive polymer such as perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyetheretherketone-based polymers, and polyphenylquinoxaline-based polymers. In a preferred embodiment, the proton conductive polymer is at least one of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

The binder resins may be used singularly or in combinations. They may be used along with non-conductive polymers to improve adherence with a polymer electrolyte membrane. The binder resins may be used in a controlled amount as needed. Non-limiting examples of the non-conductive polymers include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

The catalysts of a cathode and an anode are respectively present on an electrode substrate. The electrode substrate plays a role of supporting an electrode, and also of spreading a fuel and an oxidant to a catalyst layer to help the fuel and oxidant to easily approach the catalyst layer. As for the electrode substrate, a conductive substrate is used, for example carbon paper, carbon cloth, carbon felt, or metal cloth (a porous film including metal cloth fiber or a metalized polymer fiber), but it is not limited thereto.

The electrode substrate may be treated with a fluorine-based resin to be water-repellent, which can prevent deterioration of reactant diffusion efficiency due to water generated during fuel cell operation. The fluorine-based resin includes polyvinylidene fluoride, polytetrafluoroethylene, fluorinated ethylene propylene, polychlorotrifluoroethylene, fluoroethylene polymers, and so on.

A micro-porous layer (MPL) can be added between the electrode substrate and catalyst layer to increase reactant diffusion effects. In general, the microporous layer may include, but is not limited to, a small sized conductive powder such as a carbon powder, carbon black, acetylene black, activated carbon, carbon fiber, fullerene, nano-carbon, or a combination thereof. The nano-carbon may include a material such as carbon nanotubes, carbon nanofibers, carbon nanowire, carbon nanohorns, carbon nanorings, or combinations thereof.

The microporous layer is formed by coating a composition including a conductive powder, a binder resin, and a solvent on the conductive substrate. The binder resin may include, but is not limited to, polytetrafluoro ethylene (PTFE), polyvinylidene fluoride, polyhexafluoro propylene, polyperfluoroalkylvinyl ether, polyperfluoro sulfonyl fluoride, alkoxy vinyl ether, polyvinylalcohol, celluloseacetate, and copolymers thereof. The solvent may include, but is not limited to, an alcohol such as ethanol, isopropyl alcohol, ethyl alcohol, n-propyl alcohol, or butyl alcohol; water; dimethylacetamide (DMAc); dimethyl formamide; dimethyl sulfoxide (DMSO); N-methylpyrrolidone; or tetrahydrofuran. The coating method may include, but is not limited to, screen printing, spray coating, doctor blade methods, gravure coating, dip coating, silk screening, painting, and so on, depending on the viscosity of the composition.

According to another embodiment, a membrane-electrode assembly includes a polymer electrolyte membrane interposed between the cathode and anode.

The electrolyte plays a role of selectively transmitting OH⁻ ions, and can include an alkali aqueous solution or a solid electrolyte membrane having -OH groups and transferring $OH^-$ ions. The alkaline aqueous solution can include KOH, NaOH, LiOH, or a mixture thereof, and the solid electrolyte membrane with $OH^-$ groups can include a solid polymer membrane that is commercially available (for example, a solid polymer membrane made by Tokuyama Co). The alkaline aqueous solution can have concentrations appropriately regulated depending on an amount ratio of elements in a catalyst.

According to one embodiment of the present invention, the above membrane-electrode assembly is included in a fuel cell system. The fuel cell system includes at least one electricity generating element, a fuel supplier, and an oxidant supplier.

The electricity generating element includes a membrane-electrode assembly and separators. The membrane-electrode assembly includes a polymer electrolyte membrane, and a cathode and an anode positioned at respective sides of the polymer electrolyte membrane. The electricity generating element generates electricity through oxidation of a fuel and reduction of an oxidant.

The fuel supplier supplies the electricity generating element with a fuel including hydrogen, and the oxidant supplier supplies the electricity generating element with an oxidant. The fuel includes liquid or gaseous hydrogen, or a hydrocarbon-based fuel such as methanol, ethanol, propanol, butanol, or natural gas. The oxidant includes oxygen or air.

According to the embodiment of the present invention, a fuel cell system can be applied without limit to an alkaline electrolyte fuel cell, an alkaline electrolyte direct oxidation fuel cell, or a mixed reactant fuel cell.

FIG. 1 shows a schematic structure of a fuel cell system 100 that will be described in detail with reference to the accompanying drawing as follows. FIG. 1 illustrates a fuel cell system 100 wherein a fuel and an oxidant are provided to the electricity generating element through pumps, but the present invention is not limited to such structures. The fuel cell system of the present invention alternatively includes a structure wherein a fuel and an oxidant are provided in a diffusion manner.

A fuel cell system 100 includes at least one electricity generating element 115 that generates electrical energy through an electrochemical reaction of a fuel and an oxidant, a fuel supplier 120 for supplying a fuel to the electricity generating element 115, and an oxidant supplier 130 for supplying the oxidant to the electricity generating element 115. In addition, the fuel supplier 120 is equipped with a tank 122, which stores fuel, and a pump 124, which is connected therewith. The fuel pump 124 supplies fuel stored in the tank 122, with a predetermined pumping power. The oxidant supplier 130, which supplies the electricity generating element 115 with the oxidant, is equipped with at least one pump 132 for supplying the oxidant with a predetermined pumping power.

The electricity generating element 115 includes a membrane-electrode assembly 112, which oxidizes hydrogen or a fuel and reduces an oxidant, and separators 114 and 114' that are respectively positioned at opposite sides of the membrane-electrode assembly and supply hydrogen or a fuel, and an oxidant, respectively. At least one electricity generating element 115 is included in stack 110.

The following examples illustrate the present invention in more detail. However, it is understood that the present invention is not limited by these examples.

Example 1

1.3 g of copper acetylacetonate and 1.5 g of $C_{36}H_{51}Cl_2NbO_3$ were dissolved in 15 ml of isopropyl alcohol, and 1 g of ketjen black was added thereto. The resulting product was agitated for 4 hours. Then, it was dried at 250° C. for 3 hours under vacuum, producing a powder including a Cu-Nb-containing oxide supported in ketjen black. 0.25 g of $H_2TeO_3$ was dissolved in 2 ml of water, and the powder was mixed therewith. The resulting product was heat-treated at 400° C. for 3 hours under a hydrogen atmosphere, producing a CuNbTe/C catalyst.

Herein, the catalyst included a CuNbTe compound in a ratio of 46 atom % of Cu, 31 atom % of Nb, and 23 atom % of Te. In addition, an active material including the CuNbTe compound had a particle size of 2.5 nm, and 67 wt % of the CuNbTe compound was supported in ketjen black.

Example 2

1.3 g of Ag(NO)$_3$ and 4.3 g of Hf[OC(CH$_3$)$_3$] were dissolved in 15 ml of isopropyl alcohol, and 1 g of ketjen black was added thereto. The resulting product was agitated for 4 hours. Then, it was dried at 250° C. for 3 hours under vacuum, producing a powder including a Ag-Hf-containing oxide supported in ketjen black. 0.03 g of a Se powder was dissolved in 2 ml of water, and the powder was mixed therewith. The resulting product was heat-treated under a hydrogen atmosphere at 400° C. for 3 hours, producing a AgHfSe/C catalyst.

Herein, the catalyst included a AgHfSe compound in a ratio of Ag:47 atom %, Hf:32 atom %, Se:21 atom %. In addition, an active material including the AgHfSe compound had a particle size of 2.2 nm, and 64 wt % of the AgHfSe compound was supported in ketjen black.

Example 3

2.1 g of Cu(NO$_3$)$_2$ and 3.8 g of Ta(OCH$_2$CH$_2$CH$_2$CH$_3$)$_5$ were dissolved in 15 ml of isopropyl alcohol, and 1 g of ketjen black was added thereto. The resulting product was agitated for 4 hours. Then, it was dried at 250° C. for 3 hours under vacuum, producing a powder including a Cu-Ta-containing oxide supported in ketjen black. 0.06 g of S powder was dissolved in 2 ml of water, and the powder was mixed therewith. The resulting product was heat-treated at 400° C. for three hours under a hydrogen atmosphere, preparing a CuTaS/C catalyst.

The catalyst included a CuTaS compound with a ratio of Cu:49 atom %, Ta:31 atom %, and S:20 atom %. In addition, an active material including the CuTaS compound had a particle size of 2.7 nm, and 67 wt % of the compound was supported in ketjen black.

Comparative Example 1

0.6 g of ruthenium carbonyl, 0.03 g of a Se powder, and 1 g of ketjen black were added to 150 ml of toluene and mixed together. The resulting product was agitated for 24 hours. The mixture was filtered, and the residue was dried at 80° C., obtaining a powder. The powder was heat-treated at 250° C. in a reactor supplied with hydrogen, producing a RuSe/C catalyst. The RuSe/C compound respectively included 90 atom % of Ru and 10 atom % of Se. In addition, an active material including the RuSe compound had a particle size of 8.6 nm, and 45 wt % of the compound was supported in ketjen black.

Fabrication of a Test Cell

Test cells were fabricated by using catalyst according to Example 1 and Comparative Example 1 in the following method.

10 parts by weight of the catalyst according to Example 1 or Comparative Example 1 were added to a mixed solvent of water and isopropyl alcohol in a weight ratio of 10:80. Then, 40 parts by weight of 10 wt %-Nafion® (Dupont Co.) aqueous dispersion solution were added to the solvent, and then ultrasound was applied thereto. The resulting product was uniformly agitated, preparing a composition for forming a cathode catalyst layer.

A carbon paper substrate (a cathode/anode=SGL 31BC/10DA; SGL carbon group products), which was treated with tetrafluoroethylene (TEFLON), was spray-coated with the composition for forming a catalyst layer to fabricate a cathode. An anode was fabricated by the same method by using a PtRu black catalyst. Herein, the anode catalyst was coated at 6 mg/cm$^2$, and the cathode catalyst was coated at 4 mg/cm$^2$.

Then, the cathode and anode were stacked at both sides of a polymer electrolyte membrane (Nafion 115. Membrane, Dupont Co.) to fabricate a membrane-electrode assembly. The membrane-electrode assembly was interposed between gaskets and also between two separators having a gas flow channel and a cool channel, which had a predetermined shape, and then compressed between copper end plates to fabricate a single cell.

Each single cell according to Example 1 and Comparative Example 1 was supplied with 1M of methanol and dry air, and then operated at 70° C. for 10 minutes to measure a voltage and estimate a current density. The results are provided in FIG. 2.

Figure 2:
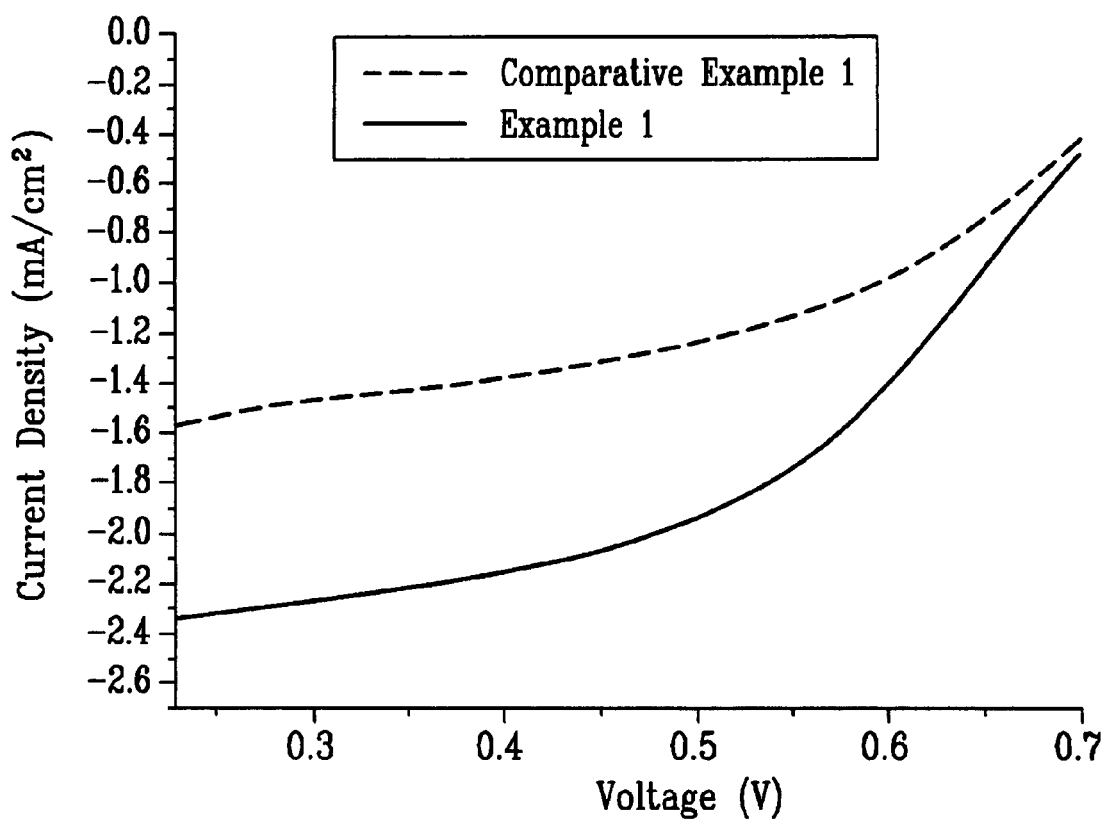
FIG. 2 is a graph showing power output characteristics of single cells including catalysts according to the present invention and that of a Comparative Example.

As shown in FIG. 2, the single cell including a CuNbTe/C catalyst of Example 1 turned out to have a much better power output characteristic than the one including a RuSe/C catalyst of Comparative Example 1. The result also showed that the CuNbTe/C catalyst of Example 1 had 35% more activity than the RuSe/C catalyst of Comparative Example 1.

As for the AgHfSe/C catalyst of Example 2 and the CuTaS/C catalyst of Example 3, single cells were also fabricated by the same method. These single cells were measured regarding a voltage and estimated regarding current density by the same method.

The result showed that the single cell including a catalyst of Examples 2 and 3 turned out to have an equivalent voltage to that of the single cell including a CuNbTe/C catalyst of Example 1. Based on this result, the catalysts of Examples 2 and 3 could have activity as excellent as that of Example 1. Therefore, since a cathode catalyst of the present invention is stable and has excellent activity for reduction of an oxidant, the cathode catalyst can improve performance of a membrane-electrode assembly and a fuel cell system including it.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cathode catalyst, comprising:
    an active material comprising an A-B-X compound, wherein A is selected from the group consisting of Cu, Ag, and a combination thereof, B is selected from the group consisting of Nb, Hf, Ta, and combinations thereof, and X is selected from the group consisting of S, Se, Te, and combinations thereof; and
    a carrier of a carbon-based material supporting the active material.

2. The cathode catalyst of claim 1, wherein the A-B-X compound comprises 35 to 55 atom % of A, 25 to 35 atom % of B, and 10 to 40 atom % of X.

3. The cathode catalyst of claim 1, wherein the A-B-X compound is a metal cluster compound.

4. The cathode catalyst of claim 1, wherein the active material has an average particle diameter ranging from 1 to 3 nm.

5. The cathode catalyst of claim 1, wherein the active material is supported in an amount ratio ranging from 5 to 70 wt % by the carrier.

6. The cathode catalyst of claim 1, wherein the carrier is selected from the group consisting of activated carbon, denka black, ketjen black, acetylene black, graphite, and combinations thereof.

7. The cathode catalyst of claim 1, wherein the cathode catalyst is adapted to be used for an alkaline electrolyte fuel cell.

8. The cathode catalyst of claim 1, wherein the cathode catalyst is adapted to be used for an alkaline electrolyte direct oxidation fuel cell.

9. The cathode catalyst of claim 1, wherein the cathode catalyst is adapted to be used for a mixed reactant fuel cell.

10. A membrane-electrode assembly, comprising:
an anode and a cathode opposing each other; and
an electrolyte arranged between the anode and the cathode, wherein the cathode comprises a cathode catalyst comprising:
an active material comprising an A-B-X compound, wherein A is selected from the group consisting of Cu, Ag, and a combination thereof, B is selected from the group consisting of Nb, Hf, Ta, and combinations thereof, and X is selected from the group consisting of S, Se, Te, and combinations thereof; and
a carrier of a carbon-based material supporting the active material.

11. The membrane-electrode assembly of claim 10, wherein the active material is selected from a group consisting of CuNbTe, AgHfSe and CuTaS.

12. A fuel cell system, comprising:
at least one electricity generating element comprising at least one membrane-electrode assembly which comprises an anode and a cathode facing each other and an electrolyte arranged therebetween;
a fuel supplier adapted to supply the electricity generating element with a fuel; and
an oxidant supplier adapted to supply the electricity generating element with an oxidant supply, wherein the cathode comprises a cathode catalyst comprising:
an active material comprising an A-B-X compound, wherein A is selected from the group consisting of Cu, Ag, and a combination thereof, B is selected from the group consisting of Nb, Hf, Ta, and combinations thereof, and X is selected from the group consisting of S, Se, Te, and combinations thereof; and
a carrier of a carbon-based material supporting the active material.

13. The fuel cell system of claim 12, the fuel cell system being an alkaline electrolyte fuel cell system.

14. The fuel cell system of claim 12, the fuel cell system being a direct oxidation alkaline electrolyte fuel cell system.

15. The fuel cell system of claim 12, the fuel cell system being a mixed reactant fuel cell system.

16. The cathode catalyst of claim 1, wherein the active material is selected from a group consisting of CuNbTe, AgHfSe and CuTaS.

17. The membrane-electrode assembly of claim 10, wherein the active material is selected from a group consisting of CuNbTe, AgHfSe and CuTaS.

18. The fuel cell system of claim 12, wherein the active material is selected from a group consisting of CuNbTe, AgHfSe and CuTaS.

* * * * *